United States Patent
Takikawa et al.

(10) Patent No.: US 8,771,088 B2
(45) Date of Patent: Jul. 8, 2014

(54) DAMPER DEVICE

(75) Inventors: Yoshihiro Takikawa, Tsushima (JP); Yoichi Oi, Anjo (JP); Kazuto Maruyama, Nishio (JP); Kazuhiro Itou, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/431,288

(22) Filed: Mar. 27, 2012

(65) Prior Publication Data

US 2012/0252586 A1  Oct. 4, 2012

(30) Foreign Application Priority Data

Mar. 28, 2011 (JP) ................... 2011-070506

(51) Int. Cl.
*F16F 15/123* (2006.01)
(52) U.S. Cl.
USPC ......................... 464/68.8; 464/68.9
(58) Field of Classification Search
USPC ............... 464/67.1, 68.1, 68.7–68.9
See application file for complete search history.

(56) References Cited

U.S. PATENT DOCUMENTS

| | | | |
|---|---|---|---|
| 4,606,451 A * | 8/1986 | Martinez-Corral et al. . | 464/67.1 X |
| 5,609,526 A * | 3/1997 | Kitayama et al. | |
| 6,131,487 A * | 10/2000 | Jackel et al. | |
| 7,651,399 B2 * | 1/2010 | Wack ........................... | 464/68.9 |

| | | |
|---|---|---|
| 2009/0183962 A1 | 7/2009 | Nakamura |
| 2010/0133063 A1 * | 6/2010 | Degler |
| 2012/0048057 A1 * | 3/2012 | Fafet et al. |

FOREIGN PATENT DOCUMENTS

| | | | |
|---|---|---|---|
| JP | A-08-240244 | | 9/1996 |
| JP | A-2001-513182 | | 8/2001 |
| JP | A-2007-113661 | | 5/2007 |
| JP | A-2009-168226 | | 7/2009 |
| WO | WO 2010079273 | * | 7/2010 |

OTHER PUBLICATIONS

Standler, B. "Technical Writing." Sep. 24, 1999, [online]. [retrieved on Nov. 3, 2013]. Retrieved from the Internet: <URL:http://www.rbs0.com/tw.htm>.*
International Search Report issued in International Application No. PCT/JP2012/057445 dated Apr. 24, 2012 (with translation).

* cited by examiner

*Primary Examiner* — Gregory Binda
*Assistant Examiner* — Josh Skroupa
(74) *Attorney, Agent, or Firm* — Oliff PLC (57) ABSTRACT

A damper device including an input element to which power from a motor is transmitted; a first elastic body to which the power is transmitted from the input element; a first intermediate element to which the power is transmitted from the first elastic body; a second elastic body to which the power is transmitted from the first intermediate element; a second intermediate element to which the power is transmitted from the second elastic body, a third elastic body to which the power is transmitted from the second intermediate element; and an output element to which the power is transmitted from the third elastic body. The second elastic body is lighter than the first elastic body.

10 Claims, 4 Drawing Sheets

DAMPER DEVICE

INCORPORATION BY REFERENCE

The disclosure of Japanese Patent Application No. 2011-070506 filed on Mar. 28, 2011 including the specification, drawings and abstract is incorporated herein by reference in its entirety.

BACKGROUND OF THE INVENTION

The present invention relates to damper devices including an input element to which power from a motor is transmitted, a first intermediate element to which the power is transmitted from the input element via a first elastic body, a second intermediate element to which the power is transmitted from the first intermediate element via a second elastic body, and an output element to which the power is transmitted from the second intermediate element via a third elastic body.

DESCRIPTION OF THE RELATED ART

Conventionally, a torque converter, which includes a clutch mechanism configured to mechanically couple a front cover to a turbine, and a damper device formed by a first damper mechanism and a second damper mechanism configured to operate in series with the first damper mechanism, is known as a fluid transmission apparatus that is mounted on a vehicle (see, e.g., Japanese Patent Application Publication No. 2007-113661 (JP 2007-113661 A)). The first damper mechanism forming the damper device of the torque converter includes a plurality of first coil springs, a pair of retaining plates (input-side members) to which a torque is transmitted from the clutch mechanism and which contact one of adjoining ones of the first coil springs, a first center plate (an intermediate member) that contacts the other of the adjoining ones of the first coil springs, and a second center plate that is relatively rotatably placed in a portion of the first center plate on the radially inner side thereof and that contacts both of adjoining ones of the first coil springs between the adjoining ones of the first coil springs. The second damper mechanism includes a plurality of second coil springs that are placed radially outward of the first damper mechanism and that contact the first center plate and a driven plate. Thus, in this torque converter, a torque from the front cover is transmitted to the turbine, namely a transmission device, via a path formed by the pair of retaining plates, the one of the first coil springs, the second center plate, the other of the first coil springs, the first center plate, the second coil springs on the outer peripheral side, and the driven plate.

SUMMARY OF THE INVENTION

In the conventional damper device, since the second center plate as an intermediate element is placed between adjoining ones of the first coil springs, the first center plate as an intermediate element and the second center plate may resonate. If the resonance of the first and second center plates occurs when the rotational speed (the engine rotational speed) of a piston of the clutch mechanism is relatively low and the vibration level of the entire damper device is relatively high, the vibration level of the entire damper device may be increased due to the resonance, and relatively large vibrations may be transmitted to a downstream side of the damper device. However, such resonance of the first and second center plates is not considered at all in JP 2007-113661 A.

It is a primary object of the present invention to reduce, in a damper device including a plurality of intermediate elements, the influence of resonance of the plurality of intermediate elements.

A damper device according to the present invention takes the following measures in order to achieve the primary object.

A damper device according to a first aspect of the present invention includes: an input element to which power from a motor is transmitted; a first elastic body to which the power is transmitted from the input element; a first intermediate element to which the power is transmitted from the first elastic body; a second elastic body to which the power is transmitted from the first intermediate element; a second intermediate element to which the power is transmitted from the second elastic body; a third elastic body to which the power is transmitted from the second intermediate element; and an output element to which the power is transmitted from the third elastic body. In the damper device, the second elastic body is lighter than the first elastic body.

This damper device includes the input element to which the power from the motor is transmitted, the first intermediate element to which the power is transmitted from the input element via the first elastic body, the second intermediate element to which the power is transmitted from the first intermediate element via the second elastic body, and the output element to which the power is transmitted from the second intermediate element via the third elastic body. In this damper device, an elastic body lighter than the first elastic body is used as the second elastic body that is placed between the first intermediate element and the second intermediate element. Inertia of the first and second intermediate elements when the first and second intermediate elements substantially integrally resonate can be regarded as the sum of inertia of the first intermediate element, inertia of the second intermediate element, and inertia of the second elastic body placed therebetween. Accordingly, making the second elastic body lighter than the first elastic body reduces the inertia of the first and second intermediate elements and increases a resonance frequency of the first and second intermediate elements, and allows resonance of the first intermediate element and the second intermediate element to occur when the rotational speed of the input element is relatively high, namely the rotational speed of the motor is relatively high, and a torque (an excitation force) from the motor is relatively low. This can suppress an increase in the vibration level of the entire damper device (the output element) due to the resonance of the first intermediate element and the second intermediate element, and can suppress transmission of relatively large vibrations to a downstream side of the damper device. Accordingly, this damper device can satisfactorily reduce the influence of the resonance of the plurality of intermediate elements.

According to a second aspect of the present invention, a free length of the second elastic body may be shorter than a free length of the first elastic body. Thus, the second elastic body can be easily made lighter than the first elastic body.

Moreover, according to a third aspect of the present invention, rigidity of the third elastic body may be lower than rigidity of the first elastic body. Thus, the rigidity of the first elastic body can be increased to increase the resonance frequency of the first intermediate element and the second intermediate element and to reduce the resonance frequency of the entire damper device, and at the same time, the rigidity of the third elastic body can be reduced to improve the vibration damping characteristics of the entire damper device.

According to a fourth aspect of the present invention, the first and second elastic bodies may be coil springs, and the third elastic body may be an arc spring that is placed radially inward of the first and second elastic bodies. Thus, the use of the arc spring as the third elastic body can further reduce the rigidity (implement a longer stroke) of the damper device. Placing the third elastic body as the arc spring radially inward of the first and second elastic bodies reduces a centrifugal force that is applied to the third elastic body, and reduces hysteresis of the third elastic body, namely a friction force that is applied to the third elastic body when a load is reduced. Thus, satisfactory vibration damping characteristics of the third elastic body can be maintained, and the resonance of the first intermediate element and the second intermediate element can be damped by the third elastic body.

Moreover, according to a fifth aspect of the present invention, the input element may have a contact portion that contacts one end of the first elastic body, the first intermediate element may have a contact portion that is placed between the other end of the first elastic body and one end of the second elastic body adjoining the first elastic body, and that contacts both the other end of the first elastic body and the one end of the second elastic body, the second intermediate element may have a contact portion that contacts the other end of the second elastic body, and a contact portion that contacts one end of the third elastic body, and the output element may have a contact portion that contacts the other end of the third elastic body.

According to a sixth aspect of the present invention, the input element may be connected via a lockup clutch to an input member coupled to the motor, and the output element may be coupled to an input shaft of a transmission device. That is, the use of this damper device allows lockup by the lockup clutch, namely coupling between the input member and the input shaft of the transmission device, to be performed while satisfactorily suppressing transmission of vibrations from the input member to the input shaft of the transmission device when the rotational speed of the motor is very low.

DETAILED DESCRIPTION OF THE EMBODIMENTS

An embodiment of the present invention will be described.

Figure 1:
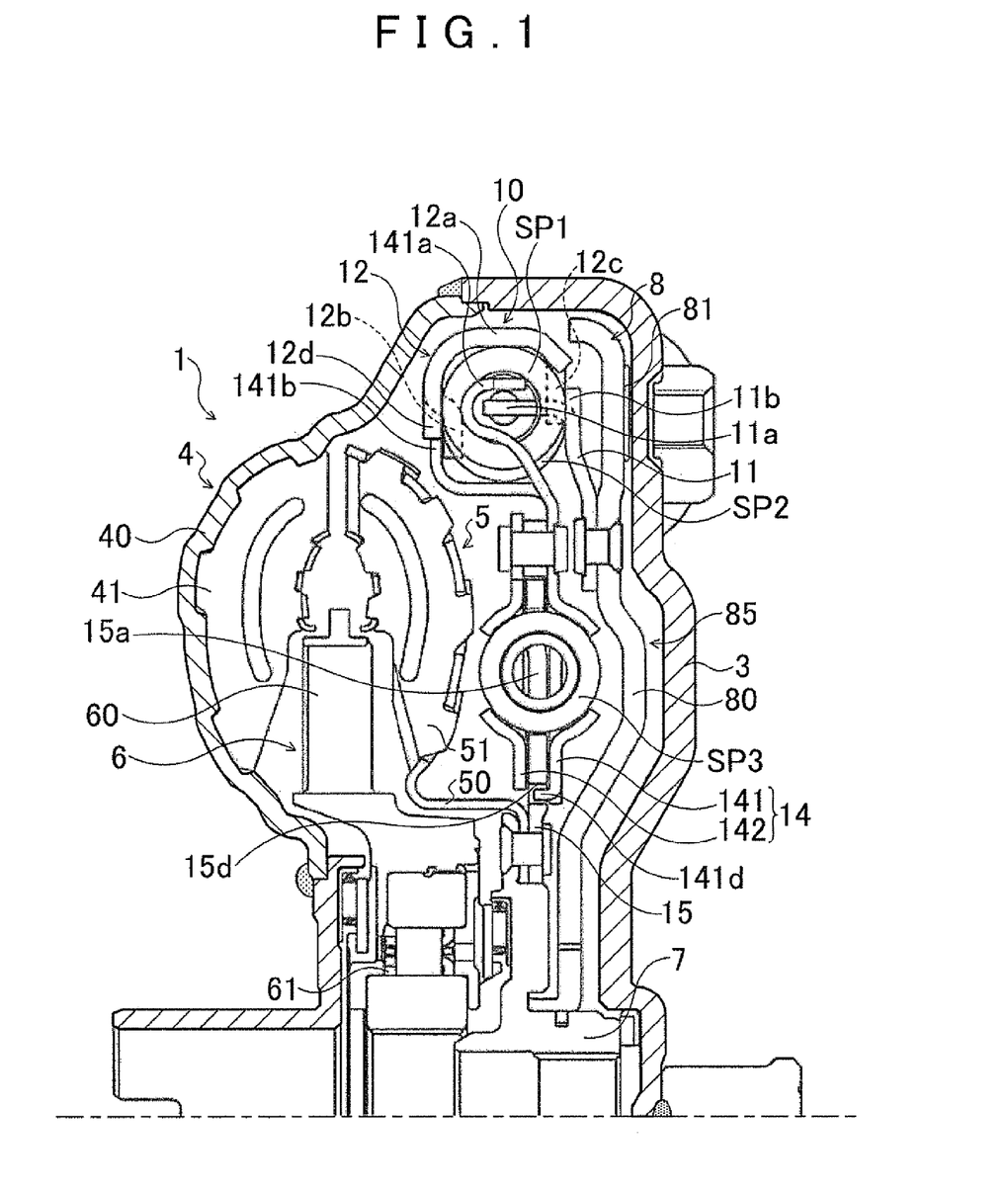
FIG. 1 is a partial cross-sectional view showing a fluid transmission apparatus 1 including a damper device 10 according to an embodiment of the present invention.

FIG. 1 is a configuration diagram showing a fluid transmission apparatus 1 including a damper device 10 according to an embodiment of the present invention. The fluid transmission apparatus 1 shown in FIG. 1 is a torque converter that is mounted as a starting device in a vehicle including an engine (an internal combustion engine) as a motor. The fluid transmission apparatus 1 includes a front cover (an input member) 3 that is coupled to a crankshaft of the engine (not shown), a pump impeller (an input-side fluid transmission element) 4 fixed to the front cover 3, a turbine runner (an output-side fluid transmission element) 5 capable of rotating coaxially with the pump impeller 4, a stator 6 configured to rectify a flow of hydraulic oil (hydraulic fluid) from the turbine runner 5 to the pump impeller 4, a damper hub (an output member) 7 that is fixed to an input shaft of a transmission device as an automatic transmission (AT) or a continuously variable transmission (CVT) (not shown), a single-plate friction lockup clutch mechanism 8 having a lockup piston 80, and the damper device 10 connected to the damper hub 7 and connected to the lockup piston 80.

The pump impeller 4 has a pump shell 40 that is firmly fixed to the front cover 3, and a plurality of pump blades 41 arranged on the inner surface of the pump shell 40. The turbine runner 5 has a turbine shell 50 and a plurality of turbine blades 51 arranged on the inner surface of the turbine shell 50. The turbine shell 50 is fitted on the damper hub 7 and is fixed to the damper hub 7 via a rivet. The stator 6 has a plurality of stator blades 60, and the rotation direction of the stator 6 is set to only one direction by a one-way clutch 61. The pump impeller 4 and the turbine runner 5 face each other, and the pump impeller 4, the turbine runner 5, and the stator 6 form a torus (an annular flow path) that circulates the hydraulic oil.

Figure 2:
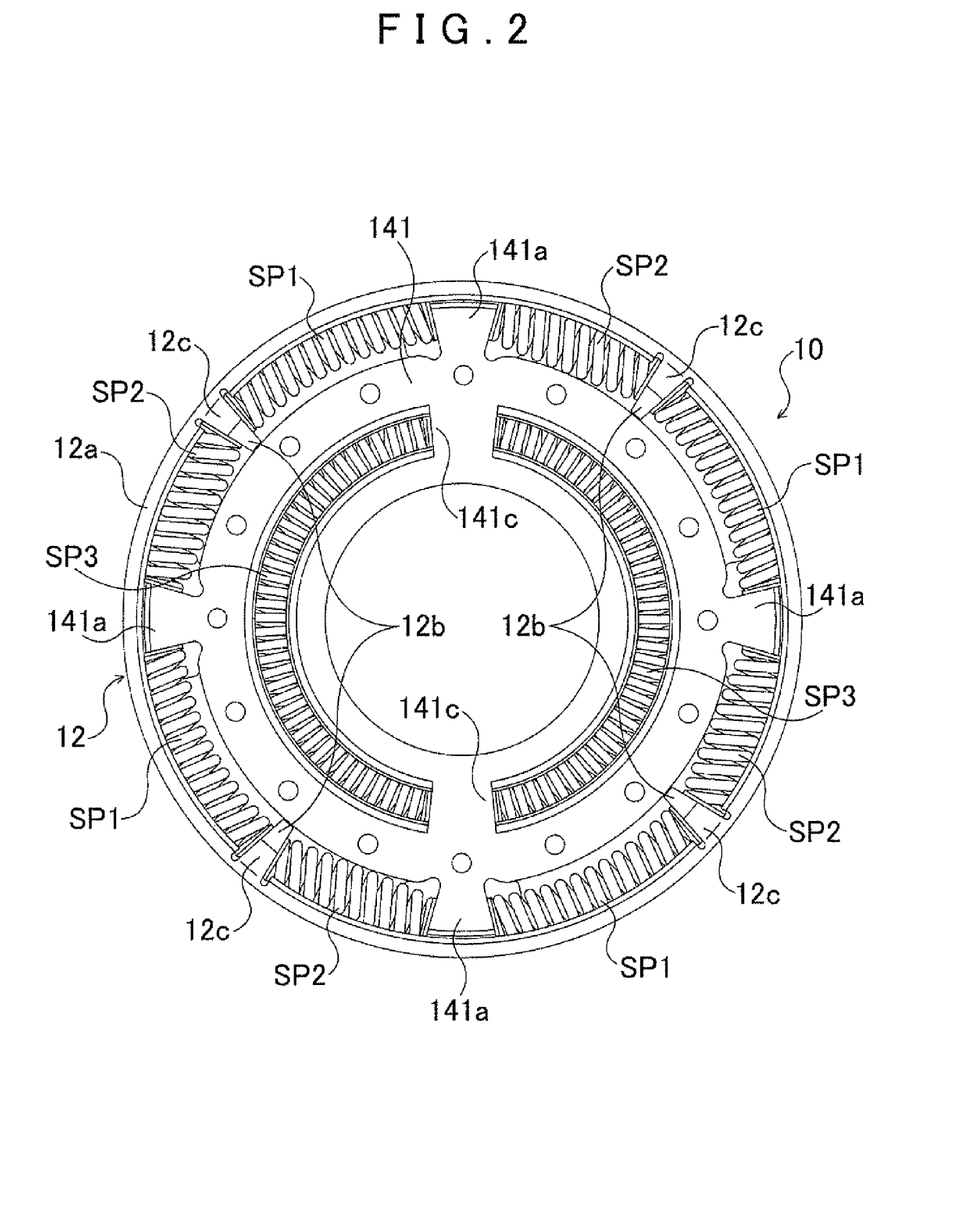
FIG. 2 is a configuration diagram showing the damper device 10.

As shown in FIGS. 1 and 2, the damper device 10 includes a drive member 11 as an input element, a first intermediate member (a first intermediate element) 12 engaging with the drive member 11 via a plurality of first springs (a first elastic body) SP1, a second intermediate member (a second intermediate element) 14 engaging with the first intermediate member 12 via a plurality of second springs (a second elastic body) SP2, and a driven member (an output member) 15 engaging with the second intermediate member 14 via a plurality of third springs (a third elastic body) SP3. The first and second springs SP1, SP2 are coil springs each made of a metal material that is coiled in a helical form so as to have a central axis extending straight when no load is applied to the first and second springs SP1, SP2. In the embodiment, coil springs having the same coil outer diameter as the first springs SP1 and having a shorter free length (a smaller number of active turns) than the first springs SP1 are used as the second springs SP2 that are placed between the first intermediate member 12 and the second intermediate member 14. Thus, rigidity (the spring constant) of the second springs SP2 is higher (larger) than that of the first springs SP1. The third springs SP3 are arc springs each made of a metal material that is coiled so as to have a central axis extending in an arc shape when no load is applied thereto.

The drive member 11 has a plurality of spring contact portions 11a each contacting one end of a corresponding one of the first springs SP1, and a plurality of spring support portions 11b. The drive member 11 is fixed to the lockup piston 80 of the lockup clutch mechanism 8 via a rivet, and is placed in an outer peripheral side region of an interior of a housing defined by the front cover 3 and the pump shell 40 of the pump impeller 4. The first intermediate member 12 is configured as an annular member that, together with the plurality of spring support portions 11b of the drive member 11, is capable of slidably supporting the first and second springs SP1, SP2 so that the first and second springs SP1, SP2 are disposed next to each other (alternately) on the same circumference. In the embodiment, the first intermediate member 12 is rotatably supported about the axis of the fluid transmission apparatus 1 by the second intermediate member 14, and is placed in the outer peripheral side region of the interior of the housing.

As shown in FIGS. 1 and 2, the first intermediate member 12 has an annular outer peripheral portion 12a surrounding the first springs SP1 and the second springs SP2, and pairs of spring contact portions 12b, 12c formed so as to protrude radially inward from the peripheral edges on both sides (both right and left sides in FIG. 1) of the outer peripheral portion 12a and to face each other. A plurality (four each in the embodiment) of the spring contact portions 12b, 12c are formed at regular intervals in the first intermediate member 12. As can be seen from FIG. 2, each of the spring contact portions 12b, 12c is placed between the other end of a corresponding one of the first springs SP1 and one end of the second spring SP2 adjoining this first spring SP1, and contacts the other end of this first springs SP1 and the one end of this second spring SP2. As shown in FIG. 1, the first intermediate member 12 further has a plurality of supported portions 12d that are formed at intervals in a circumferential direction so as to protrude radially inward from one (on the left side in FIG. 1, namely on the transmission device side) of the peripheral edges of the outer peripheral portion 12a, and that slidingly contact the second intermediate member 14.

The second intermediate member 14 is formed by an annular first plate 141 and an annular second plate 142 fixed to the first plate 141 via a rivet, and in the embodiment, is rotatably supported around the axis of the fluid transmission apparatus 1 by the driven member 15. The first plate 141 of the second intermediate member 14 has, on the outer peripheral side thereof, a plurality of spring contact portions 141a each contacting the other end of a corresponding one of the second springs SP2, and a plurality of support portions 141b configured to rotatably support the first intermediate member 12, and has, on the radially inner side thereof, a plurality of spring support portions configured to slidably support the third springs SP3. The plurality of support portions 141b of the second intermediate member 14 (the first plate 141) are formed at intervals in the circumferential direction so that each support portion 141b protrudes radially outward and slidingly contacts a corresponding one of the supported portions 12d of the first intermediate member 12. The second plate 142 of the second intermediate member 14 has spring support portions that face the spring support portions of the first plate 141 and slidably support the third springs SP3, respectively. A plurality of spring contact portions 141c (see FIG. 2) each contacting one end of a corresponding one of the third springs SP3 are formed in the first and second plates 141, 142.

Thus, by placing each of the first springs SP1 between the spring contact portion 11a of the drive member 11 and the pair of spring contact portions 12b, 12c of the first intermediate member 12, and placing each of the second springs SP2 between the corresponding pair of spring contact portions 12b, 12c of the first intermediate member 12 and the spring contact portion 141a of the second intermediate member 14, namely the first plate 141, the plurality of first springs SP1 and the plurality of second springs SP2 are placed concentrically in an outer peripheral portion of the damper device 10. Moreover, the plurality of third springs SP3 are placed so as to be separated from the first and second springs SP1, SP2 in a radial direction of the fluid transmission apparatus 1, and are located radially inward of the first and second springs SP1, SP2.

The driven member 15 is placed between the first plate 141 and the second plate 142 of the second intermediate member 14, and is fixed to the damper hub 7. The driven member 15 has a plurality of spring contact portions 15a each contacting the other end of a corresponding one of the third springs SP3. The driven member 15 further has a plurality of arc-shaped slits 15d that engage with protrusions 141d extended from an inner peripheral portion of the first plate 141 of the second intermediate member 14 so as to extend in an axial direction of the fluid transmission apparatus 1. Each protrusion 141d of the first plate 141 engages with (loosely fits in) a corresponding one of the slits 15d of the driven member 15, whereby the second intermediate member 14 is supported by the driven member 15 and placed around the axis of the fluid transmission apparatus 1, and is rotatable relative to the driven member 15 within a range according to the circumferential length of the slits 15d.

The lockup clutch mechanism 8 is capable of performing lockup to couple the front cover 3 to the damper hub 7 via the damper device 10, and is also capable of releasing the lockup. In the embodiment, as shown in FIG. 1, the lockup piston 80 of the lockup clutch mechanism 8 is placed inside the front cover 3 at a position near an inner wall surface of the front cover 3 located on the engine side (on the right side in the drawing), and is fitted to the damper hub 7 so as to be slidable and rotatable with respect to the damper hub 7 in the axial direction. A friction material 81 is bonded to a surface of the lockup piston 80 located on the front cover 3 side and in a portion of the lockup piston 80 on the outer peripheral side thereof. A lockup chamber 85, which is connected to a hydraulic control unit (not shown) via a hydraulic oil supply hole and an oil passage formed in the input shaft (both not shown), is defined between the back surface (the surface on the right side in the drawing) of the lockup piston 80 and the front cover 3.

When transmitting power between the pump impeller 4 and the turbine runner 5 without performing the lockup by the lockup clutch mechanism 8, the hydraulic oil that is supplied to the pump impeller 4 and the turbine runner 5 flows into the lockup chamber 85, and the lockup chamber 85 is filled with the hydraulic oil. Accordingly, at this time, the lockup piston 80 does not move toward the front cover 3, and the lockup piston 80 does not frictionally engage with the front cover 3. As can be seen from FIG. 3, when the lockup is released, namely when the lockup is not performed by the lockup clutch mechanism 8, power from the engine as a motor is transmitted to the input shaft of the transmission device via a path formed by the front cover 3, the pump impeller 4, the turbine runner 5, and the damper hub 7.

By depressurizing the lockup chamber 85 by the hydraulic control unit (not shown), the lockup piston 80 moves toward the front cover 3 due to the pressure difference and frictionally engages with the front cover 3. Thus, the front cover 3 is coupled to the damper hub 7 via the damper device 10. As can be seen from FIG. 3, in the lockup state in which the front cover 3 is coupled to the damper hub 7 by the lockup clutch mechanism 8, power from the engine as a motor is transmitted to the input shaft of the transmission device via a path formed by the front cover 3, the lockup clutch mechanism 8, the drive member 11, the first springs SP1, the first intermediate member 12, the second springs SP2, the second intermediate member 14, the third springs SP3, the driven member 15, and the damper hub 7. At this time, variations (vibrations) of the torque that is input to the front cover 3 are absorbed by the first and second springs SP1, SP2 and the third springs SP3 of the damper device 10.

In the fluid transmission apparatus 1 of the embodiment, the lockup clutch mechanism 8 performs the lockup when the rotational speed of the engine coupled to the front cover 3 reaches a very low lockup rotational speed Nlup of, e.g., about 1,000 rpm. This can improve power transmission efficiency between the engine and the transmission device, and thus can further improve fuel economy of the engine. If the depressurization of the lockup chamber 85 is stopped, the pressure difference associated with the hydraulic oil flowing into the lockup chamber 85 is reduced, whereby the lockup piston 80 is separated from the front cover 3, and thus the lockup is released.

In order to perform the lockup when the rotational speed of the engine reaches the very low lockup rotational speed Nlup of, e.g., about 1,000 rpm, the vibrations need be satisfactorily damped by the damper device 10 between the engine and the transmission device when the rotational speed of the engine is included in a low rotational speed range near the lockup rotational speed Nlup described above. Thus, in the damper device 10 of the embodiment, in order to improve vibration damping characteristics, the first and second springs SP1, SP2 are placed radially outward of the third springs SP3 so as to adjoin each other substantially on the same circumference as described above, thereby reducing the rigidity (implementing a longer stroke) as compared to the case where the first and second springs are placed in series in a portion of the device on the radially inner side thereof. Moreover, in the damper device 10 of the embodiment, arc springs are used as the third springs SP3 that are placed in a portion of the device on the radially inner side thereof, among the first to third springs SP1 to SP3 arranged in series. This further reduces the rigidity, and also reduces a centrifugal force that is applied to the third springs SP3 and reduces hysteresis of the third springs SP3, namely a friction force that is applied to the third springs SP3 when a load is reduced. Thus, satisfactory vibration damping characteristics of the third springs SP3 are ensured.

In the damper device 10 of the embodiment, the first and second springs SP1, SP2 are placed in series in a portion of the device on the outer peripheral side thereof, and the first intermediate member 12 is placed so as to cover the first and second springs SP1, SP2. This reduces the hysteresis of each of the first and second springs SP1, SP2, namely the friction force that is applied to the first and second springs SP1, SP2 when the load is reduced. Accordingly, the (total) hysteresis of both the first and second springs SP1, SP2 when the first and second springs SP1, SP2 operate in series can be reduced as compared to the case where, e.g., a long spring having about the same circumferential length as the total circumferential length (the sum of the circumferential lengths of the first and second springs SP1, SP2) of the first and second springs SP1, SP2 is placed in a portion of the device on the outer peripheral side thereof. Moreover, in the damper device 10 of the embodiment, the first intermediate member 12 is configured to surround the first and second springs SP1, SP2, and has the pairs of spring contact portions 12b, 12e, each pair contacting both the first and second springs SP1, SP2 between the first and second springs SP1, SP2. Thus, when the first springs SP1 and the second springs SP2 contract due to the operation of the damper device 10 etc., the first intermediate member 12 moves in the direction in which the first springs SP1 and the second springs SP2 contract. Thus, the amount of movement (the amount of relative movement) of the first intermediate member 12 relative to the first springs SP1 and the second springs SP2 can be reduced.

Figure 3:
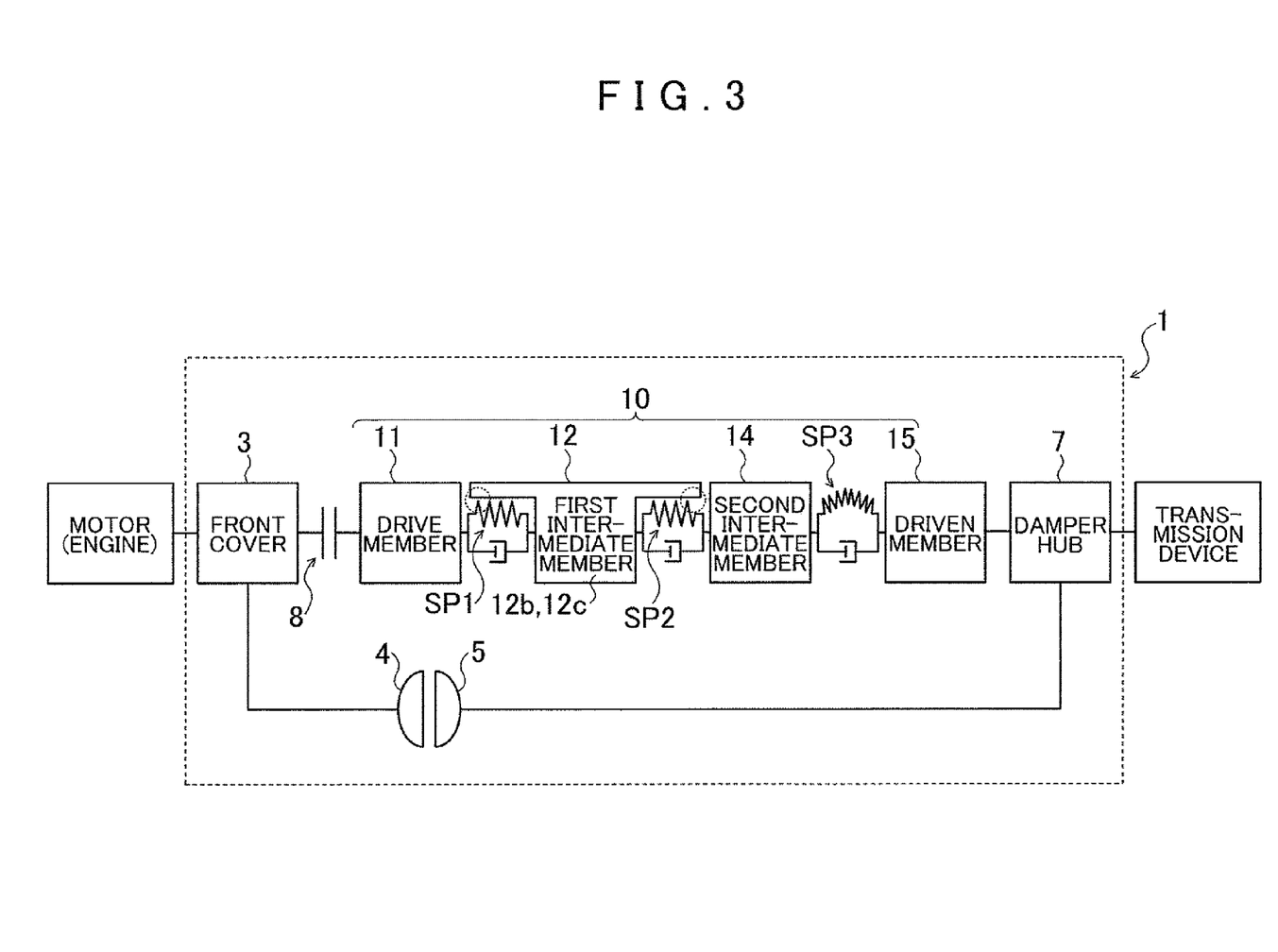
FIG. 3 is a schematic configuration diagram of the fluid transmission apparatus 1.

That is, as can be seen from FIG. 3, when the first springs SP1 and the second springs SP2 contract, the first intermediate member 12 moves in the direction in which the first springs SP1 and the second springs SP2 contract. Thus, the first and second springs SP1, SP2 do not substantially (hardly) slidingly contact the first intermediate member 12 near each pair of spring contact portions 12b, 12c, and the sliding contact between the first and second springs SP1, SP2 and the first intermediate member 12 occurs mainly at the ends (see circles in FIG. 3) of the first and second springs SP1, SP2 that are respectively located on the opposite sides from the ends on the spring contact portions 12b, 12c sides. This can suppress the sliding contact between the first and second springs SP1, SP2 and the first intermediate member 12, and can further reduce the influence of the hysteresis on the vibration damping effect of each of the first and second springs SP1, SP2. In the damper device 10 of the embodiment, coil springs are used as the first and second springs SP1, SP2. This can suppress the sliding contact between the outer peripheral portions of the first and second springs SP1, SP2 and other member (in the embodiment, the first intermediate member 12) and can further reduce the influence of the hysteresis on the vibration damping effect of the first and second springs SP1, SP2, as compared to the case where a long coil spring or arc spring is placed in a portion of the device on the outer peripheral side thereof.

On the other hand, in the fluid transmission apparatus 1 of the embodiment, since the first and second intermediate members 12, 14 as intermediate elements are placed between the first springs SP1 and the third springs SP3 of the damper device 10, the first intermediate member 12 and the second intermediate member 14 may resonate. If resonance of the first intermediate member 12 and the second intermediate member 14 occurs when the rotational speed of the engine is included in, e.g., the low rotational speed range near the lockup rotational speed Nlup described above, and the vibration level of the entire damper device 10 (the driven member 15 as an output element) is relatively high, this resonance of the first intermediate member 12 and the second intermediate member 14 may further increase the vibration level of the entire damper device 10, and relatively large vibrations may be transmitted to a downstream side of the damper device 10, namely to the input shaft of the transmission device. Thus, in order to allow the lockup clutch mechanism 8 to smoothly perform the lockup when the rotational speed of the engine reaches the very low lockup rotational speed Nlup, the resonance of the first intermediate member 12 and the second intermediate member 14 may be caused when the rotational speed of the engine is relatively high and the torque from the engine, namely an excitation force, is relatively low after completion of the lockup. In order to implement this, a resonance frequency fi of the first and second intermediate members 12, 14 may further be increased.

In order to perform the lockup when the rotational speed of the engine reaches the very low lockup rotational speed Nlup of, e.g., about 1,000 rpm as described above, it is necessary to prevent the resonance of the entire damper device 10 from occurring when the lockup is performed and the rotational speed of the engine is included in the low rotational speed range near the lockup rotational speed Nlup described above or the rotational speed of the engine further increases thereafter. In order to implement this, the resonance frequency ft of the entire damper device 10 may be further reduced so that the resonance of the entire damper device 10 occurs in a stage in which the rotational speed of the engine is as low as possible, namely in a rotational speed range in which the lockup operation is not actually performed, when it is assumed that the lockup is performed from the stage in which the rotational speed of the engine is lower than the lockup rotational speed Nlup.

The state in which the first and second intermediate members 12, 14 substantially integrally resonate corresponds to the state in which the first springs SP1 and the third springs SP3 are connected in parallel with the first and second intermediate members 12, 14 and the second springs SP2 as a single mass. In this case, a synthetic spring constant k13 of a system is "k1+k3," where "k1" represents a spring constant of the first springs SP1, and "k3" represents a spring constant of the third springs SP3. Thus, the resonance frequency (the natural frequency) fi of the first and second intermediate members 12, 14 and the second springs SP2, which substantially integrally resonate, is represented by $$fi = 1/2\pi \cdot \sqrt{\{(k1+k3)/I\}},$$

where "I" represents inertia of the first intermediate member 12, the second intermediate member 14, and the second springs SP2 as a single mass, the unit of the inertia I is "kg·m²." That is, the inertia I of the first and second intermediate members 12, 14 when the first and second intermediate members 12, 14 substantially integrally resonate can be obtained by distributing one half of the inertia of the second springs SP2 to the first intermediate member 12 and the other half thereof to the second intermediate member 14, and can be regarded as the sum of the inertia of the first intermediate member 12, the inertia of the second intermediate member 14, and the inertia of the second springs SP2 placed therebetween. When the entire damper device 10 integrally resonates, the drive member 11, the first springs SP1, the first intermediate member 12, the second springs SP2, the second intermediate member 14, the third springs SP3, and the driven member 15 are connected in series. Thus, a synthetic spring constant k123 of the system is represented by "$1/k123 = 1/k1 + 1/k2 + 1/k3$,"

where "k2" represents a spring constant of the second springs SP2, and the resonance frequency ft of the entire damper device 10 is represented by $$ft = 1/2\pi \cdot \sqrt{(k123/It)}$$

(where "It" represents the inertia of the entire damper).

Accordingly, in order to cause the resonance of the first intermediate member 12 and the second intermediate member 14 when the rotational speed of the engine is relatively high after completion of the lockup, the sum of the spring constant k1 of the first springs SP1 and the spring constant k3 of the third springs SP3 may be increased as much as possible or the inertia I of the first and second intermediate members 12, 14 may be reduced as much as possible so as to further increase the resonance frequency fi of the first and second intermediate members 12, 14. In order to further reduce the resonance frequency ft of the entire damper device 10, the synthetic spring constant k123 of the system may be reduced as much as possible. In the present specification, both of the terms "rigidity" and "spring constant" indicate "force (torque)/torsional angle (the unit is 'Nm/rad' or 'Nm/deg')," and are synonyms. The rigidity (the spring constant) of the spring is decreased (becomes lower) by reducing the wire diameter of the spring or reducing the number of turns per unit length, and is increased (becomes higher) by increasing the wire diameter of the spring or the number of turns per unit length.

In view of the above, in the damper device 10 of the present embodiment, springs having the same coil outer diameter as the first springs SP1 and having a shorter free length (a smaller number of active turns) than the first springs SP1 as described above are used as the second springs SP2 that are placed between the first intermediate member 12 and the second intermediate member 14. Thus, making the free length of the second springs SP2 shorter than that of the first springs SP1 reduces the weight of the second springs SP2. This can reduce the inertia I of the first and second intermediate members 12, 14 when the first and second intermediate members 12, 14 substantially integrally resonate, and can increase the resonance frequency fi of the first and second intermediate members 12, 14, thereby allowing the resonance of the first intermediate member 12 and the second intermediate member 14 to occur when the rotational speed of the drive member 11 is relatively high, namely when the rotational speed of the engine is relatively high, and the torque (the excitation force) from the engine is relatively low.

The first intermediate member 12 of the damper device 10 of the embodiment has the annular outer peripheral portion 12a surrounding the first and second springs SP1, SP2, and the pairs of spring contact portions 12b, 12c formed so as to protrude radially inward from the peripheral edges on both sides of the outer peripheral portion 12a and to face each other, and each pair contacting both the first spring SP1 and the second spring SP2 between the first spring SP1 and the second spring SP2. Configuring the first intermediate member 12 in this manner can further reduce the weight of the second intermediate member 12. This can reduce the inertia of the first intermediate member 12, and the inertia I of the first and second intermediate members 12, 14 when the first and second intermediate members 12, 14 substantially integrally resonate, and thus can further increase the resonance frequency fi of the first and second intermediate members 12, 14.

In the damper device 10 of the embodiment, the spring constant k3 of the third springs SP3 is set to a smaller value than the spring constant k1 of the first springs SP1 in order to take advantage of the characteristics of the arc springs that the rigidity can be easily reduced as compared to the coil springs, and to maintain more satisfactory vibration damping characteristics of the third springs SP3 that are the arc springs placed radially inward of the first and second springs SP1, SP2 in order to reduce the hysteresis. That is, by setting the spring constants of the first to third springs SP1 to SP3 to "k2>k1>k3," the spring constant k1 of the first springs SP1 can be increased to increase the resonance frequency fi of the first and second intermediate members 12, 14 as much as possible and to reduce the resonance frequency ft of the entire damper device 10, and at the same time, the rigidity of the third springs SP3 can be reduced to improve the vibration damping characteristics of the entire damper device 10. Thus, the resonance of the first intermediate member 12 and the second intermediate member 14 can be satisfactorily damped by the third springs SP3.

Figure 4:
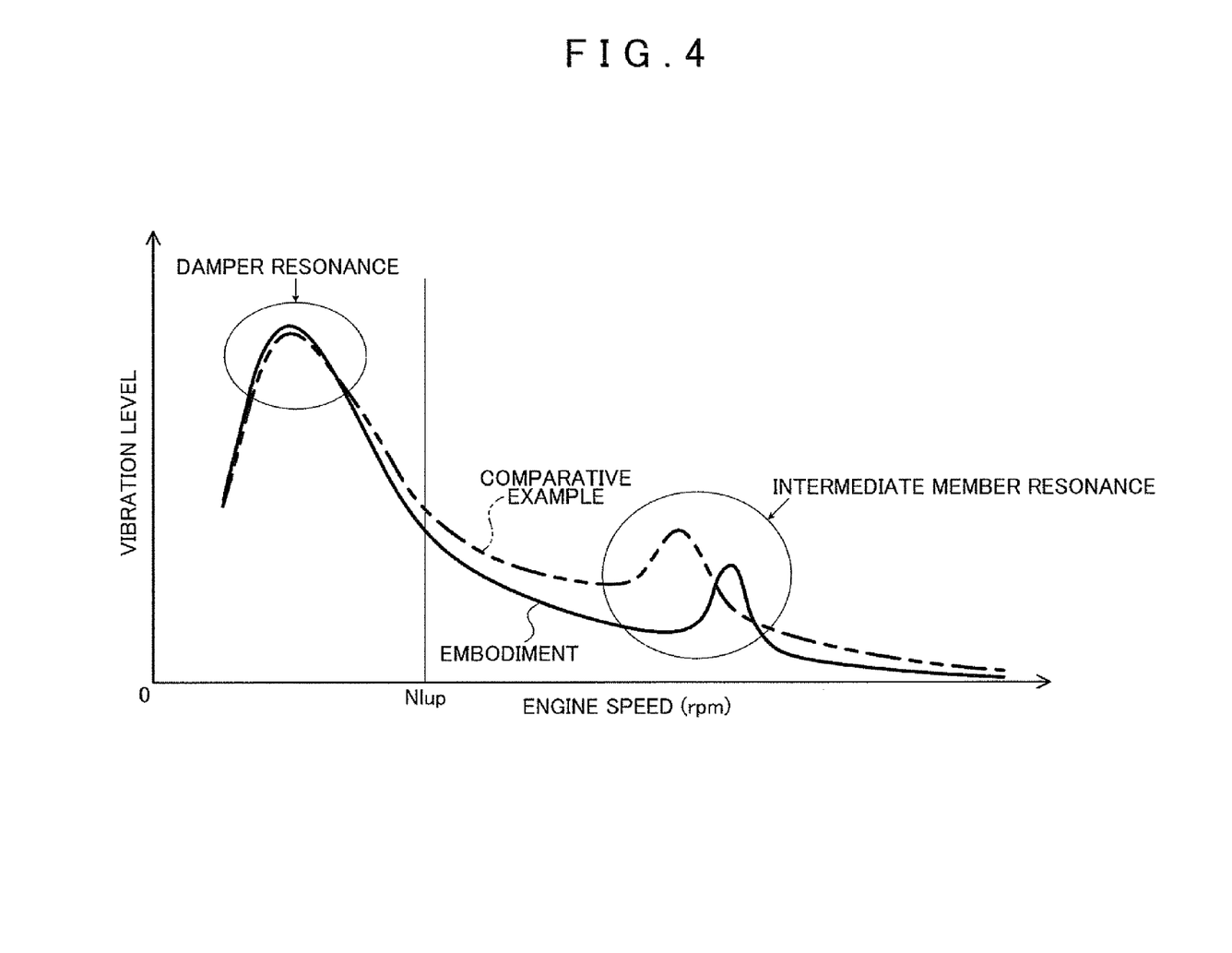
FIG. 4 is an illustration showing, by way of example, the relation between the rotational speed of an engine as a motor and the vibration level of the damper device 10.

FIG. 4 is an illustration showing, by way of example, the relation between the rotational speed of the engine and the vibration level of the damper device 10 described above in the state in which the lockup is performed. FIG. 4 shows the result of simulation of a torsional vibration system conducted in order to verify usefulness of making the free length of the second springs SP2 shorter than that of the first springs SP1, and shows, by way of example, the relation between the rotational speed of the engine (the front cover 3) and the vibration level in the driven member 15 (the damper hub 7) as the output element of the damper device in a plurality of damper devices including the damper device 10 of the embodiment obtained by the simulation. This simulation was performed by using basically the same specifications of the engine as a motor, and the same specifications of the pump impeller 4, the turbine runner 5, and the lockup clutch mechanism 8, etc. The solid line in FIG. 4 represents the vibration level of the damper device 10 of the embodiment, and two-dot chain line in FIG. 4 represents the vibration level of a model (hereinafter referred to as the "first comparative example") of the damper device having the structure similar to that described in JP 2007-113661 A. As shown in FIG. 4, in the damper device 10 of the embodiment that includes the second springs SP2 having a shorter free length than the first springs SP1, the resonance of the first intermediate member 12 and the second intermediate member 14 occurs at a higher rotational speed of the engine, and the vibration level of the resonance is reduced, as compared to the damper device of the comparative example. Accordingly, it is to be understood that reducing the free length of the second springs SP2 is extremely effective in allowing the resonance of the first and second intermediate members 12, 14 to occur at a higher rotational speed of the engine, and in reducing the vibration level of the resonance.

As described above, the damper device 10 included in the fluid transmission apparatus 1 of the embodiment includes the drive member 11 to which power from the engine as a motor is transmitted, the first intermediate member 12 to which the power is transmitted from the drive member 11 via the first springs SP1, the second intermediate member 14 to which the power is transmitted from the first intermediate member 12 via the second springs SP2, and the driven member 15 to which the power is transmitted from the second intermediate member 14 via the third springs SP3. In the damper device 10, springs lighter than the first springs SN are used as the second springs SP2 that are placed between the first intermediate member 12 and the second intermediate member 14.

Thus making the second springs SP2 lighter than the first springs SP1 reduces the inertia I of the first and second intermediate members 12, 14 and increases the resonance frequency fi of the first and second intermediate members 12, 14, thereby allowing the resonance of the first intermediate member 12 and the second intermediate member 14 to occur when the rotational speed of the drive member 11 is relatively high, namely the rotational speed of the engine is relatively high, and the torque (the excitation force) from the engine is relatively low. This can suppress an increase in the vibration level of the entire damper device 10 (the driven member 15 as the output element) due to the resonance of the first intermediate member 12 and the second intermediate member 14, and thus can suppress transmission of relatively large vibrations to a downstream side of the damper device 10. Accordingly, in the damper device 10 of the embodiment, the influence of the resonance of the first intermediate member 12 and the second intermediate member 14 can be satisfactorily reduced. In the case where the resonance point of the vehicle on which the damper device 10 is mounted is relatively close to the resonance point of the first intermediate member 12 and the second intermediate member 14, the resonance point on the vehicle side can be easily separated from the resonance point of the first intermediate member 12 and the second intermediate member 14 by making the second springs SP2 lighter than the first springs SP1 as described above.

The second springs SP2 can be easily made lighter than the first springs SP1 by making the free length of the second springs SP2 shorter than that of the first springs SP1 as in the embodiment. Note that in the embodiment, springs having the same coil outer diameter as the first springs SP1 and having a shorter free length (a smaller number of active turns) than the first springs SP1 are used as the second springs SP2. However, the present invention is not limited to this. That is, springs having a smaller wire diameter than the first springs SP1 and having a shorter free length (a smaller number of active turns) than the first springs SP1 may be used as the second springs SP2. Thus, the rigidity (the spring constant) of the first springs SP1 is made higher (larger) than that of the second springs SP2, whereby the resonance frequency fi of the first intermediate member 12 and the second intermediate member 14 can be increased, and the resonance frequency ft of the entire damper device 10 can be reduced.

Moreover, by making the rigidity of the third springs SP3 lower than that of the first springs SP1 as in the embodiment, the rigidity of the first springs SP1 can be increased to increase the resonance frequency fi of the first and second intermediate elements 12, 14 as much as possible and to reduce the resonance frequency ft of the entire damper device 10, and at the same time, the rigidity of the third springs SP3 can be reduced to improve the vibration damping characteristics of the entire damper device 10. Furthermore, using the coil springs as the first and second springs SP1, SP2 and using the arc springs as the third springs SP3 on the radially inner side as in the embodiment can further reduce the rigidity (implement a longer stroke) of the damper device 10. Placing the third springs SP3 as the arc springs radially inward of the first and second springs SP1, SP2 reduces a centrifugal force that is applied to the third springs SP3, and reduces the hysteresis of the third springs SP3, whereby satisfactory vibration damping characteristics of the third springs SP3 can be maintained. It should be noted that the rigidity of the third springs SP3 may be lower than that of the second springs SP2 and equal to or higher than that of the first springs SP1.

The drive member 11 forming the damper device 10 of the embodiment is connected via the lockup clutch mechanism 8 to the front cover 3 as the input member coupled to the engine, and the driven member 15 is coupled to the input shaft of the transmission device. That is, the use of the damper device 10 described above allows the lockup by the lockup clutch mechanism 8, namely coupling between the front cover 3 and the input shaft of the transmission device, to be performed while satisfactorily suppressing transmission of vibrations from the front cover 3 to the input shaft of the transmission device when the rotational speed of the engine is very low.

Note that although the fluid transmission apparatus 1 described above is configured as a torque converter including the pump impeller 4, the turbine runner 5, and the stator 6, the fluid transmission apparatus including the damper device according to the present invention may be configured as a fluid coupling having no stator. The fluid transmission apparatus 1 described above may include a multi-plate friction lockup clutch mechanism instead of the single-plate friction lockup clutch mechanism 8.

Correspondence between the main elements of the embodiment etc. and the main elements of the invention described in the section "SUMMARY OF THE INVENTION" will be described below. That is, in the embodiment etc., the drive member 11 to which power from the engine as a motor is transmitted corresponds to the "input element," the first springs SP1 as coil springs to which the power is transmitted from the drive member 11 correspond to the "first elastic body," the first intermediate member 12 to which the power is transmitted from the first springs SP1 corresponds to the "first intermediate element," the second springs SP2 as coil springs to which the power is transmitted from the first intermediate member 12 correspond to the "second elastic body," the second intermediate member 14 to which the power is transmitted from the second springs SP2 corresponds to the "second intermediate element," the third springs SP3 as arc springs to which the power is transmitted from the second intermediate member 14 correspond to the "third elastic body," and the driven member 15 to which the power is transmitted from the third springs SP3 corresponds to the "output element."

The correspondence between the main elements of the embodiment and the main elements of the invention described in the section "SUMMARY OF THE INVENTION" is shown merely as an example in order to specifically describe the aspects of the invention described in the section "SUMMARY OF THE INVENTION," and is not intended to limit the elements of the invention described in the section "SUMMARY OF THE INVENTION," That is, the embodiment is shown merely as a specific example of the invention described in the section "SUMMARY OF THE INVENTION," and the invention described in the section "SUMMARY OF THE INVENTION" should be construed based on the description in that section.

Although the embodiment of the invention is described above, it should be understood that the present invention is not limited to the embodiment, and various modifications can be made without departing from the spirit and scope of the present invention.

The present invention can be used in the manufacturing industry of damper devices, etc.

What is claimed is:

1. A damper device, comprising:
   an input element;
   a first elastic body, wherein the input element is configured to transmit power from a motor to the first elastic body;
   a first intermediate element, wherein the first elastic body is configured to transmit power from the input element to the first intermediate element;
   a second elastic body, wherein the first intermediate element is configured to transmit power from the first elastic body to the second elastic body and the second elastic body;
   a second intermediate element, wherein the second elastic body is configured to transmit power from the first intermediate element to the second intermediate element;
   a third elastic body, wherein the second intermediate element is configured to transmit power from the second elastic body to the third elastic body; and
   an output element, wherein the third elastic body is configured to transmit power from the second intermediate element to the output element,
   wherein the first elastic body, the second elastic body and the third elastic body are arranged in series, and
   wherein the second elastic body placed between the first intermediate element and the second intermediate element is lighter than the first elastic body.

2. The damper device according to claim 1, wherein a free length of the second elastic body is shorter than a free length of the first elastic body.

3. The damper device according to claim 2, wherein rigidity of the third elastic body is lower than rigidity of the first elastic body.

4. The damper device according to claim 3, wherein the first and second elastic bodies are coil springs, and the third elastic body is an arc spring that is placed radially inward of the first and second elastic bodies.

5. The damper device according to claim 4, wherein
   the input element has a contact portion that contacts one end of the first elastic body,
   the first intermediate element has a contact portion that is placed between the other end of the first elastic body and one end of the second elastic body adjoining the first elastic body, and that contacts both the other end of the first elastic body and the one end of the second elastic body,
   the second intermediate element has a contact portion that contacts the other end of the second elastic body, and a contact portion that contacts one end of the third elastic body, and
   the output element has a contact portion that contacts the other end of the third elastic body.

6. The damper device according to claim 5, wherein
   the input element is connected via a lockup clutch to an input member coupled to the motor, and the output element is coupled to an input shaft of a transmission device.

7. The damper device according to claim 1, wherein rigidity of the third elastic body is lower than rigidity of the first elastic body.

8. The damper device according to claim 1, wherein the first and second elastic bodies are coil springs, and the third elastic body is an arc spring that is placed radially inward of the first and second elastic bodies.

9. The damper device according to claim 1, wherein
   the input element has a contact portion that contacts one end of the first elastic body,
   the first intermediate element has a contact portion that is placed between the other end of the first elastic body and one end of the second elastic body adjoining the first elastic body, and that contacts both the other end of the first elastic body and the one end of the second elastic body,
   the second intermediate element has a contact portion that contacts the other end of the second elastic body, and a contact portion that contacts one end of the third elastic body, and
   the output element has a contact portion that contacts the other end of the third elastic body.

10. The damper device according to claim 1, wherein
    the input element is connected via a lockup clutch to an input member coupled to the motor, and the output element is coupled to an input shaft of a transmission device.

* * * * *